(12) United States Patent
Brock et al.

(10) Patent No.: US 7,845,366 B2
(45) Date of Patent: Dec. 7, 2010

(54) WELDABLE MOUNT FOR FUEL SYSTEM COMPONENT

(75) Inventors: Michael S. Brock, Connersville, IN (US); John M. Lopez, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 694 days.

(21) Appl. No.: 11/549,305

(22) Filed: Oct. 13, 2006

(65) Prior Publication Data
US 2007/0107779 A1 May 17, 2007

Related U.S. Application Data

(60) Provisional application No. 60/726,283, filed on Oct. 13, 2005, provisional application No. 60/746,418, filed on May 4, 2006, provisional application No. 60/807,915, filed on Jul. 20, 2006.

(51) Int. Cl.
  *F16K 24/04* (2006.01)
(52) U.S. Cl. .................. 137/202; 137/43; 285/141.1; 285/382.4; 285/423

(58) Field of Classification Search .................... 137/43, 137/202, 587; 251/366; 285/141.1, 382.4, 285/423
See application file for complete search history.

(56) References Cited

U.S. PATENT DOCUMENTS

| | | | |
|---|---|---|---|
| 5,139,043 A | 8/1992 | Hyde et al. | |
| 5,404,907 A | 4/1995 | Benjey et al. | |
| 6,189,567 B1 | 2/2001 | Folta | |
| 6,289,915 B1 * | 9/2001 | Nulman et al. | 137/43 |
| 6,308,735 B1 | 10/2001 | Foltz | |
| 6,502,607 B2 * | 1/2003 | Brown et al. | 141/1 |
| 6,662,820 B2 | 12/2003 | Dunkle | |
| 6,733,048 B2 * | 5/2004 | Kurihara et al. | 285/423 |
| 7,267,376 B2 * | 9/2007 | Isayama et al. | 285/423 |
| 2003/0062083 A1 | 4/2003 | Nishi et al. | |

FOREIGN PATENT DOCUMENTS

GB  2271157  6/1994

* cited by examiner

*Primary Examiner*—Stephen Hepperle
*Assistant Examiner*—Craig M Schneider
(74) *Attorney, Agent, or Firm*—Barnes & Thornburg LLP

(57) ABSTRACT

A vent apparatus is adapted to be mounted in an aperture formed in a fuel tank. The vent apparatus includes a vent controller sized to extend through the fuel tank aperture and an outer cover coupled to the vent controller and welded to the fuel tank to support the vent controller in the fuel tank aperture.

14 Claims, 8 Drawing Sheets

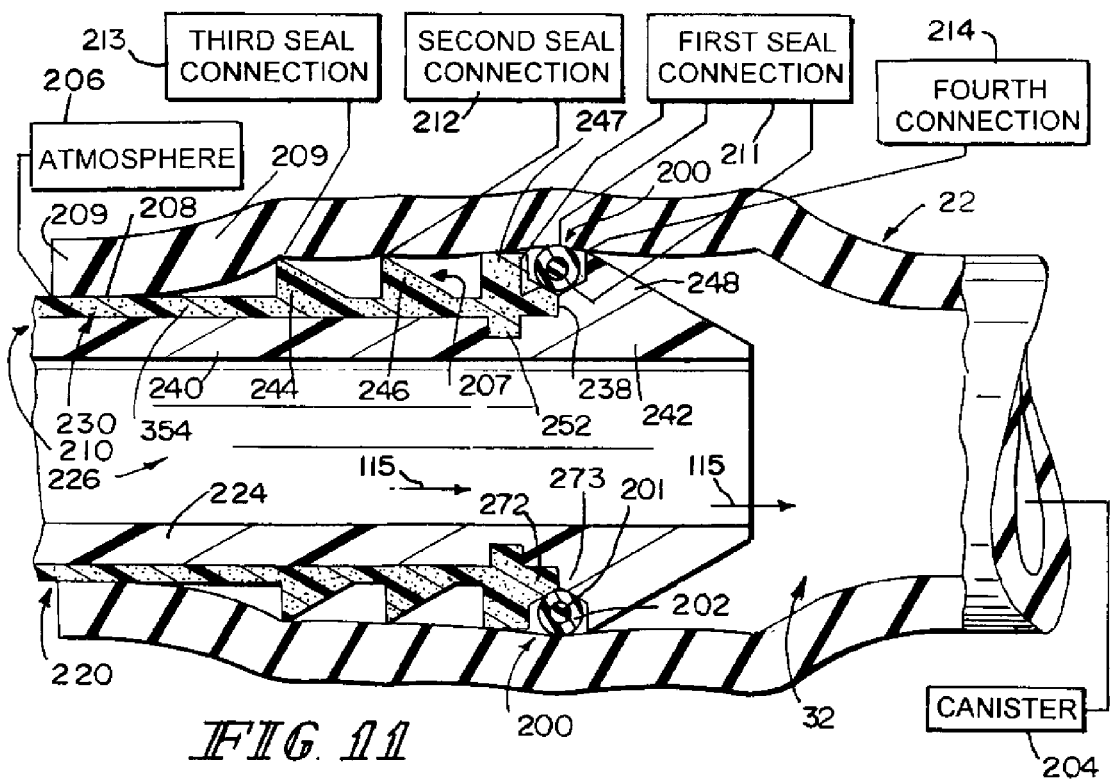
FIG. 11
FIG. 12
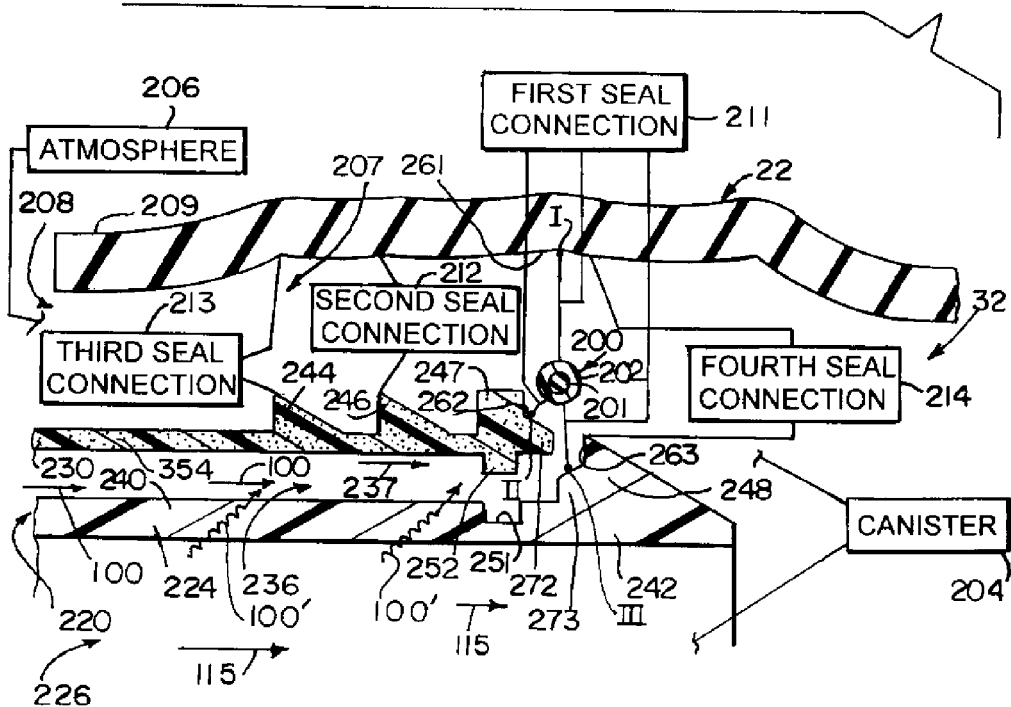

WELDABLE MOUNT FOR FUEL SYSTEM COMPONENT

This application claims priority under 35 U.S.C. §119(e) to U.S. Provisional Application Ser. No. 60/726,283, filed Oct. 13, 2005; U.S. Provisional Application Ser. No. 60/746,418, filed May 4, 2006; and U.S. Provisional Application Ser. No. 60/807,915, filed Jul. 20, 2006, which are expressly incorporated by reference herein.

BACKGROUND

The present disclosure relates to a fuel system component, and particularly to a fuel tank valve assembly for venting a fuel tank made of a polymeric material. More particularly, the present disclosure relates to a weldable mount that is adapted to be welded to a fuel tank to mount a fuel tank valve assembly in a fixed position in an aperture formed in a top wall of the fuel tank.

SUMMARY

In accordance with the present disclosure, a vent apparatus is adapted to be mounted in an aperture formed in a fuel tank to manage flow of air and fuel vapor through the fuel tank aperture. The vent apparatus includes a vent controller sized to extend through the fuel tank aperture and an outer cover coupled to the vent controller and adapted to be coupled to the fuel tank to close the fuel tank aperture and to support the vent controller in communication with an interior region in the fuel tank.

In illustrative embodiments, the outer cover comprises an exterior shell adapted to be welded to the fuel tank and an interior base coupled to the vent controller. Illustratively, the exterior shell is made of high density polyethylene (HDPE), the interior base is made of acetal, and the exterior shell is "overmolded" onto the interior base to produce the outer cover.

Also in illustrative embodiments, a radially outermost "perimeter" portion of the acetal interior base is anchored in a position above a "weld" pad included in the HDPE exterior shell. The weld pad is that outer and lower portion of the HDPE exterior shell that is mated with the top wall of the fuel tank (while the vent controller is located in the fuel tank aperture) and heated and melted during a welding operation. The weld pad then is allowed to cool to weld the exterior shell of the outer cover to the top wall of the fuel tank and thereby retain the vent controller that is coupled to the interior base of the exterior cover in a fixed position in the fuel tank aperture.

In illustrative embodiments, the outer cover also includes a venting outlet adapted to be coupled to a vapor discharge hose to conduct fuel vapor that has been discharged from a fuel tank through the fuel tank aperture in a manner regulated by the vent controller to a destination (e.g., fuel vapor recovery canister) outside of the fuel tank. The venting outlet engages and mates with the vapor discharge hose to establish several fuel vapor seal connections therebetween. In illustrative embodiments, the interior base included in the outer cover includes an inner outlet conduit providing a vent passageway and the exterior shell included in the outer cover includes an outer outlet conduit surrounding the inner outlet conduit to define the venting outlet.

Several alternative versions of the venting outlet are disclosed herein. In a first embodiment of the venting outlet, two frustoconical annular hose mounts are formed in a distal portion of the inner outlet conduit and an O-ring seal is coupled to the inner outlet conduit to establish seal connections with the vapor discharge hose. In a second embodiment, sealing connections between the venting outlet and the vapor discharge hose are provided by two frustoconical annular hose mounts formed in the outer outlet conduit, an O-ring seal coupled to the outer outlet conduit, and a frustoconical annular hose mount formed in a distal portion of the inner outlet conduit. In a third embodiment, sealing connections between the venting outlet and the vapor discharge hose are provided by two frustoconical annular hose mounts formed in the outer outlet conduit, an O-ring seal coupled to both of the inner and outer outlet conduits, and a frustoconical annular hose mount formed in a distal portion of the inner outlet conduit.

Additional features of the present disclosure will become apparent to those skilled in the art upon consideration of the following detailed description of illustrative embodiments of the disclosure exemplifying the best mode of carrying out the disclosure as presently perceived.

BRIEF DESCRIPTION OF THE DRAWINGS

The detailed description particularly refers to the accompanying figures in which:

FIG. 11 is a sectional view similar to FIG. 9 showing a portion of a vent apparatus in accordance with a third embodiment of the present disclosure wherein a vapor discharge hose is coupled to a venting outlet included in an outer cover of a vent apparatus to establish a "multiple-seal" connection between the vapor discharge hose and the venting outlet and wherein the venting outlet includes an outer outlet conduit surrounding an inner outlet conduit and an O-ring seal coupled to both of the inner and outer outlet conduits;

FIG. 12 is an exploded sectional view similar to FIG. 11 of a portion of the venting outlet and the mating vapor discharge hose suggesting that a "first" seal connection is a "ready-state" seal established by mating engagement of an O-ring seal with the vapor discharge hose at a first (circular) contact line (I), with the outer outlet conduit of the venting outlet at a second (circular) contact line (II), and with the inner outlet conduit of the venting outlet at a third (circular) contact line (III) to provide means for blocking flow of any hydrocarbon material along a route at an interface or seam between the inner outlet conduit and a surrounding outer outlet conduit into a vent passageway formed in the vapor discharge hose to prevent discharge of such hydrocarbon material through the vent passageway to either (1) the atmosphere exposed to a free end of the vapor discharge hose mating with an external surface of the outer outlet conduit or (2) a canister coupled to the vapor discharge hose;

DETAILED DESCRIPTION OF THE DRAWINGS

Figure 1:
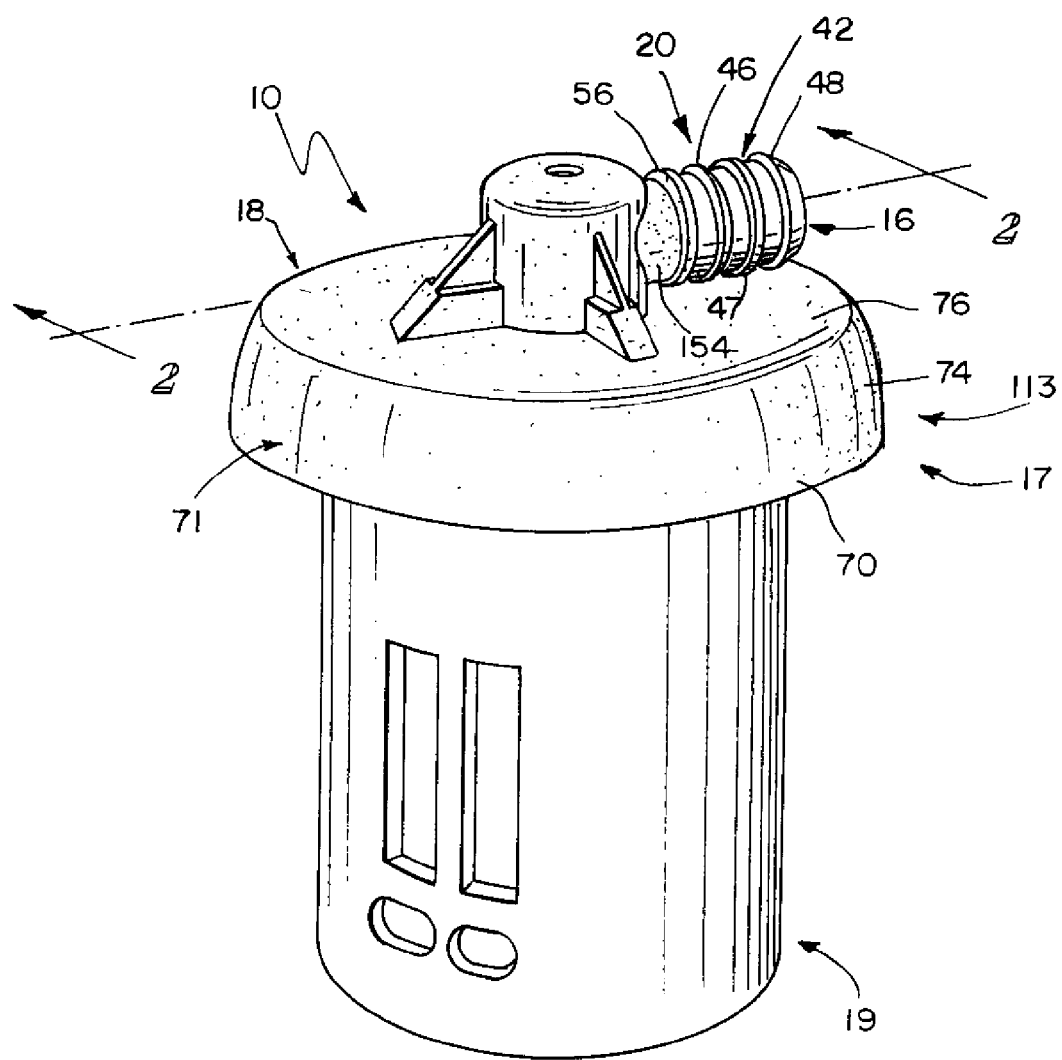
FIG. 1 is a perspective view of a vent apparatus in accordance with a first embodiment of the present disclosure showing an outer cover formed to include a laterally extending venting outlet (with the O-ring seal of FIG. 2 omitted) and showing a cylinder-shaped vent controller extending downwardly from the outer cover.
Figure 2:
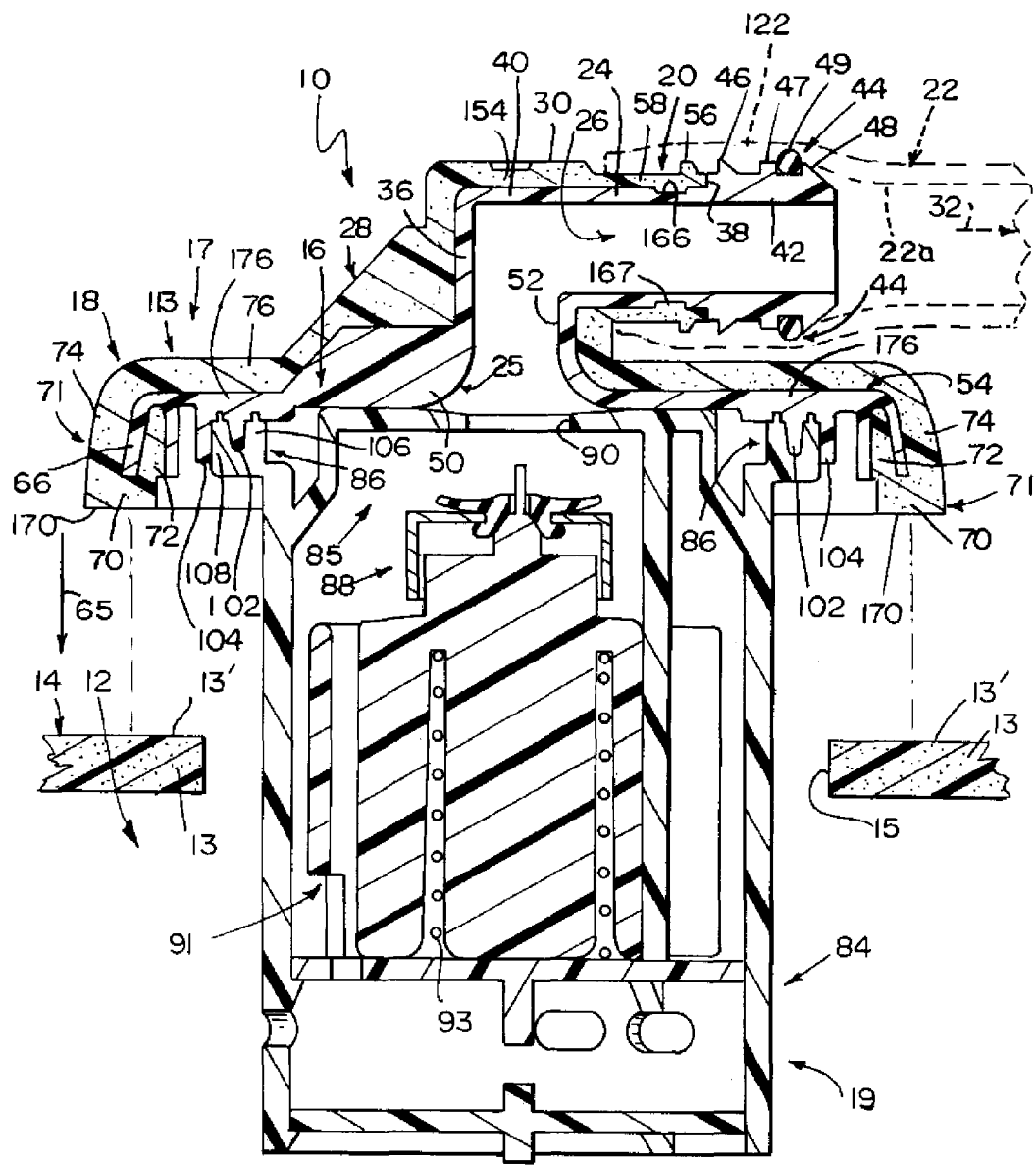
FIG. 2 is a sectional view taken along line 2-2 of FIG. 1 showing (1) the vent apparatus of FIG. 1 as it is being lowered into an aperture formed in a top wall of a fuel tank made of an HDPE plastics material; (2) the interior base coupled to an upper portion of the vent controller to fix the vent controller to the outer cover; (3) an exterior shell overmolded onto the interior base to produce the outer cover; and (4) a fuel tank vapor discharge hose, in phantom, coupled to the venting outlet included in the outer cover of the vent apparatus and suggesting a "multiple-seal" connection between the vapor discharge hose and the venting outlet wherein the venting outlet includes an outer outlet conduit surrounding an inner inlet conduit and an O-ring seal coupled to a distal portion of the inner inlet conduit.

A vent apparatus 10 is shown, for example, in FIG. 1 and is used as suggested in FIG. 2 to conduct fuel tank vapor from an interior region 12 of a fuel tank 14 to a destination outside of fuel tank 14 without emitting hydrocarbon materials associated with fuel tank vapor flowing through vent apparatus 10 to the atmosphere at levels in excess of governmental emission regulations. Vent apparatus 10 includes an outer cover 17 and a vent controller 19 coupled to outer cover 17. Outer cover 17 is adapted to be coupled to fuel tank 14 to close a mounting aperture 15 opening into interior region 12 of fuel tank 14. Vent controller 19 is coupled to an underside of a controller mount 113 included in outer cover 17 and arranged to extend downwardly through mounting aperture 15 into interior region 12 of fuel tank 14.

Figure 7:
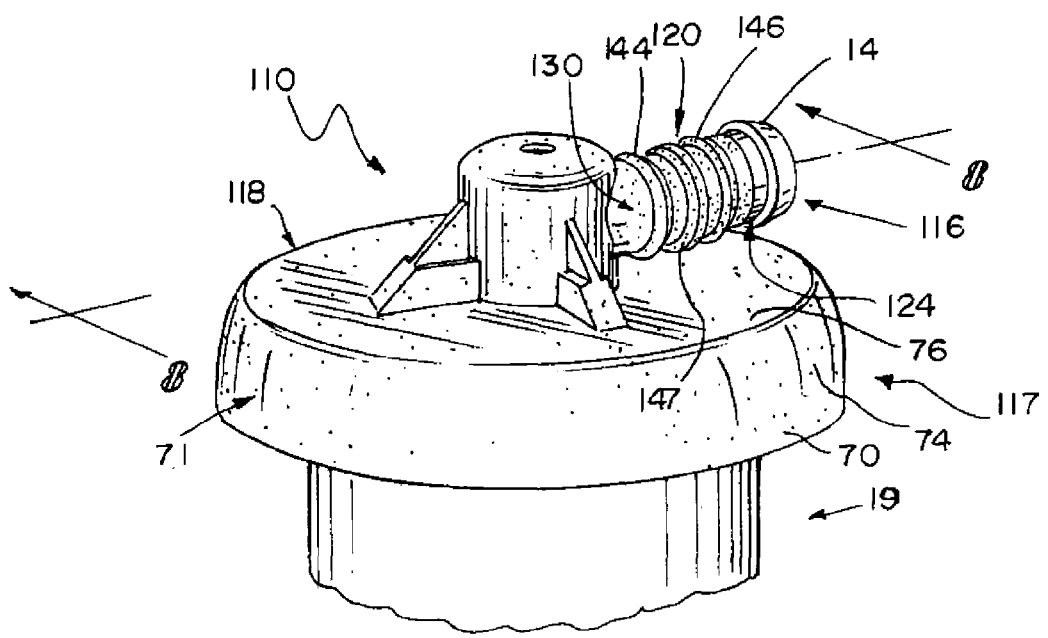
FIG. 7 is a perspective view of a vent apparatus in accordance with a second embodiment of the present disclosure, with portions broken away, showing an outer cover formed to include a laterally extending venting outlet (with the O-ring seal of FIG. 8 omitted) and showing a portion of a cylinder-shaped vent controller extending downwardly from the outer cover.
Figure 9:
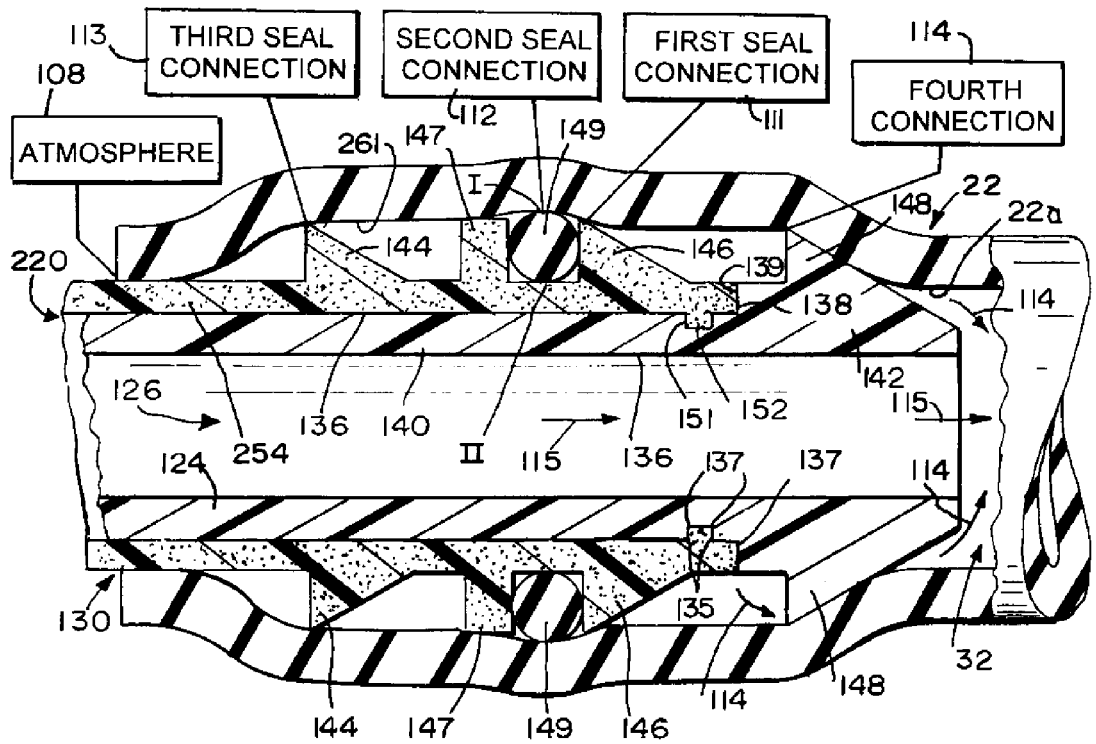
FIG. 9 is an enlarged sectional view showing the multiple-seal connection established between the vapor discharge hose and the venting outlet and wherein the venting outlet includes an outer outlet conduit surrounding an inner outlet conduit and an O-ring seal coupled to the outer outlet conduit.

Outer cover 17 is also formed to include a venting outlet 20 in accordance with a first embodiment of the present disclosure as shown in FIG. 1. Venting outlet 20 is coupled to controller mount 113 and adapted to be coupled to a vapor discharge tube 22 (shown in phantom in FIG. 2). A venting outlet 120 in accordance with a second embodiment of the present disclosure is shown in FIG. 7 and is adapted to be coupled to a vapor discharge tube 22 as shown in FIG. 9. A venting outlet 220 in accordance with a third embodiment of the present disclosure is shown in FIGS. 11 and 12.

Outer cover 17 includes an exterior shell 18 made of a weldable plastics material such as high density polyethylene (HDPE) and adapted to be coupled to a wall 13 included in fuel tank 14 at a mounting aperture 15 formed in fuel tank wall 13. In an illustrative embodiment, both exterior shell 18 and fuel tank wall 13 are made of HDPE. Outer cover 17 also includes an interior base 16 made of a different plastics material, such as acetal (POM), that is resistant to hydrocarbon permeation. Interior base 16 is coupled to vent controller 19. In an illustrative embodiment, the portion of vent controller 19 that is coupled to the acetal interior base 16 is also made of acetal. Although an acetal part cannot be welded properly to an HDPE part, it can be welded to another acetal part.

Interior base 16 and exterior shell 18 of outer cover 17 cooperate to define a venting outlet 20 that is coupled to a separate vapor discharge hose 22 (shown in phantom) as suggested in FIG. 2. Hose 22 functions to conduct fuel tank vapor discharged from fuel tank 14 through mounting aperture 15 via venting outlet 20 to a destination outside fuel tank 14. Hose 22 is made, for example, of a nylon material.

Venting outlet 20 is adapted to mate with vapor discharge hose 22 to establish several seal connections as suggested in FIG. 2. Venting outlet 20 comprises an inner outlet conduit 24, an outer outlet conduit 30, and an O-ring seal 49 coupled to inner outlet conduit 24 as suggested in FIG. 2.

Interior base 16 includes an inner outlet conduit 24 and a foundation 25 coupled to inner outlet conduit 24 as shown in FIG. 2. Foundation 25 is interposed between and coupled to exterior shell 18 and to vent controller 19 in a manner shown, for example, in FIG. 2. Foundation 25 includes a central portion 50 formed to include a vent passageway 52 communicating with a vent passageway 26 formed in inner outlet conduit 24. Foundation 25 also includes a peripheral portion 54 arranged to surround central portion 50 and configured to mate with vent controller 19.

Exterior shell 18 is formed to include an outer outlet conduit 30 as suggested in FIG. 2. Exterior shell 18 is coupled to interior base 16 as suggested, for example, in FIGS. 2 and 4 to cause outer outlet conduit 30 to engage and surround a portion of inner outlet conduit 24. Inner and outer outlet conduits 24, 30 cooperate with O-ring seal 49 to form venting outlet 20 adapted to be coupled to vapor discharge hose 22 as suggested, for example, in FIG. 2.

Exterior shell 18 further includes a tank mount 28 coupled to outer outlet conduit 30 as suggested, for example, in FIG. 2. In the illustrated embodiment, tank mount 28 is made of the same polymeric material (e.g., HDPE) as fuel tank 14 and is adapted to be coupled (e.g. by welding) to fuel tank 14 at mounting aperture 15 to allow flow of fuel tank vapor in interior region 12 of fuel tank 14 through mounting aperture 15 into vent passageway 52 formed in central portion 50 of foundation 25 and then into vent passageway 26 formed in inner outlet conduit 24 for delivery into vapor discharge hose 22. Illustratively, exterior shell 18 is "overmolded" onto interior base 16 as suggested in FIGS. 5 and 6.

Vapor discharge hose 22 is formed to include a vapor-conducting passageway 32 and is coupled to outer outlet conduit 30 as suggested in FIG. 2 to establish a sealed connection therebetween. Vent passageway 26 formed in inner outlet conduit 24 is placed in fluid communication with vapor-conducting passageway 32 formed in vapor discharge hose 22. This arrangement causes any hydrocarbon material associated with fuel tank vapor in vent passageway 26 that has reached an interface or seam 36 between inner and outer outlet conduits 24, 30 and moved toward vapor discharge hose 22 along interface 36 to be discharged into vapor-conducting passageway 32 formed in vapor discharge hose 22.

Outer outlet conduit 30 is formed to include a terminal opening 38. Inner outlet conduit 24 extends through terminal opening 38 to define a shielded portion 40 surrounded by outer outlet conduit 30 and an exposed portion 42 located outside of outer outlet conduit 30 as suggested, for example, in FIG. 2. Vapor discharge hose 22 is coupled to outer outlet conduit 30 to locate exposed portion 42 in vapor-conducting passageway 32 of vapor discharge hose 22. Vapor discharge hose 22 is also coupled to and arranged to surround exposed portion 42 as suggested at 44 in FIG. 2 to establish a sealed connection therebetween to block flow of fuel tank vapor in vapor-conducting passageway 32 into the atmosphere along an interface between exposed portion 42 of inner outlet conduit 24 and vapor discharge hose 22.

As suggested in FIGS. 1 and 2, tank mount 28 of exterior shell 18 also includes an annular weld pad 70, a foundation canopy 71, and a foundation anchor 72. Foundation canopy 71 rises up from an outer edge of annular weld pad 70 to cover a radially outermost portion of foundation 25. Foundation anchor 72 rises up from an inner edge of annular weld pad 70 to trap an annular flange 66 included in the radially outermost portion of foundation 25 between foundation canopy 71 and foundation anchor 72.

Annular weld pad 70 is adapted to be coupled to fuel tank 14 (as by, e.g., welding) at mounting aperture 15. A "hotplate" welding process can be used, for example, to couple annular weld pad 70 of tank mount 28 to a top wall 13 of fuel tank 14 to provide a "low-permeation" joint therebetween to minimize unwanted fuel tank vapor leakage therebetween. It is within the scope of the present disclosure to make weld pad 70 of any material that can be welded to top wall 13 of fuel tank 14.

Foundation canopy 71 is arranged to extend between annular weld pad 70 and inner outlet conduit 24 and to mate with an exterior surface of foundation 25 of interior base 16 as shown in FIG. 2. Foundation canopy 71 includes a vertical ring 74 and a horizontal ring 76. Vertical ring 74 extends upwardly from annular weld pad 70 as suggested in FIG. 2. Horizontal ring 76 extends laterally from vertical ring 74 toward outlet conduit 30 to overlie an annular horizontal plate 176 included in foundation 25 as shown in FIG. 2.

Figure 3:
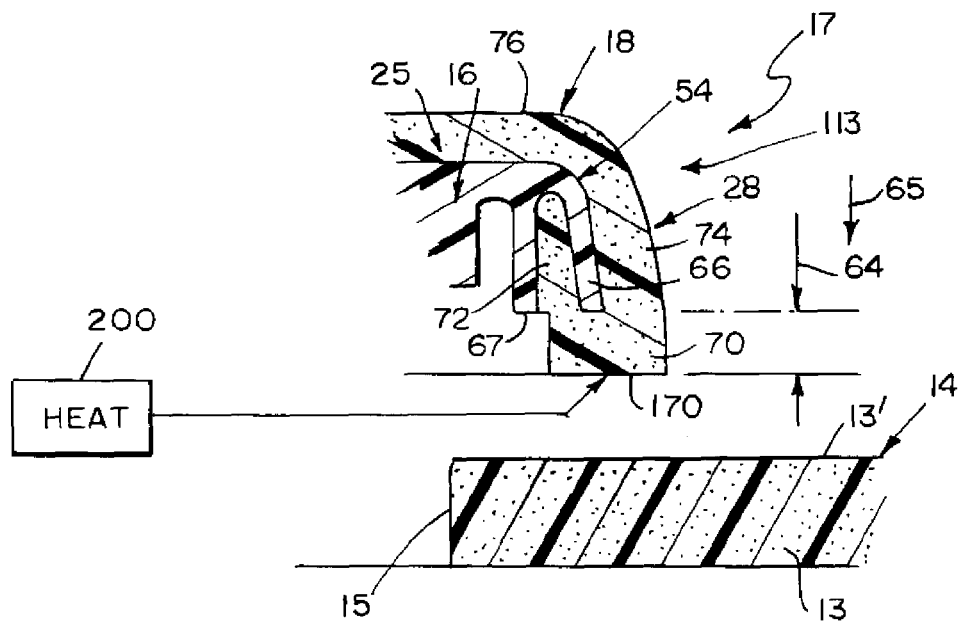
FIG. 3 is an enlarged partial sectional view of portions of the outer cover of the vent apparatus and the top wall of the fuel tank shown in FIG. 2 before they are mated.
Figure 4:
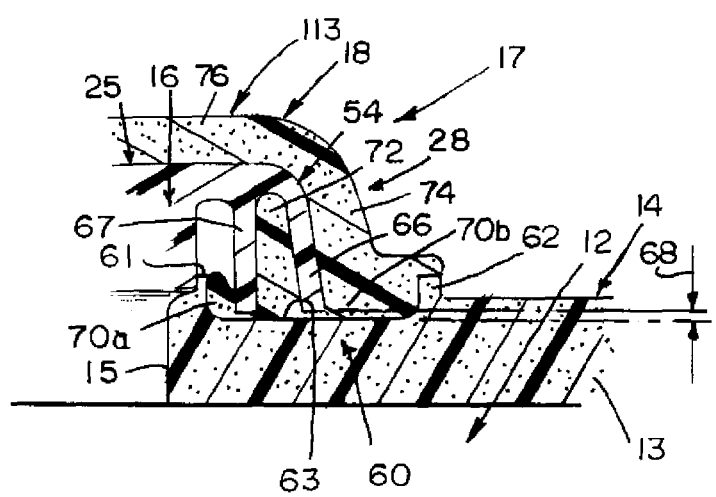
FIG. 4 is a view similar to FIG. 3 showing that an HDPE weld pad included in the exterior shell of the outer cover has been mated with and welded to the HDPE top wall of the fuel tank to anchor the vent apparatus in a fixed position in the aperture formed in the top wall of the fuel tank.

Foundation anchor 72 is arranged to extend upwardly in a direction toward overlying annular horizontal plate 176 of foundation 25 and horizontal ring 76 of foundation canopy 71 as suggested in FIGS. 2-4. A radially outermost portion of annular horizontal plate 176 is trapped between horizontal ring 76 and an uppermost tip of foundation anchor 72 as shown in FIGS. 2-4. Vertical ring 74 is annular and arranged to surround and lie in spaced-apart relation to annular foundation anchor 72 to trap annular flange 66 of foundation 25 therebetween.

Vent controller 19 is included in vent apparatus 10 as suggested, for example, in FIG. 2. Vent controller 19 is configured to regulate flow of fuel vapor from interior region 12 of fuel tank 14 into vent passageway 26 formed in inner outlet conduit 24 of venting outlet 20.

As suggested in FIG. 2, vent controller 19 includes a valve housing 84, an anchor 86 coupled to valve housing 84, and a valve 88 located in valve housing 84. Anchor 86 is positioned to establish a sealed connection between valve housing 84 and interior base 16. In illustrative embodiments, anchor 86 is welded to foundation 25 of interior base 16 using, for example, suitable spin-welding or laser-welding techniques. Valve 88 is arranged to move relative to valve housing 84 to regulate flow of fuel tank vapor from fuel tank 14 into vent passageways 52, 26.

Valve housing 84 is coupled to interior base 16 by anchor 86 and formed to include an interior region 85 receiving fuel tank vapor from interior region 12 of fuel tank 14. Valve housing 84 is also formed to include a venting aperture 90 communicating with interior region 85 and opening into vent passageway 52 formed in central portion 50 and vent passageway 26 formed in inner outlet conduit 24 as suggested in FIG. 2.

Valve 88 is positioned to lie within interior region 85 of valve housing 84 as suggested diagrammatically in FIG. 2. Valve 88 comprises a buoyant float 91 and a spring 93 under buoyant float 91 as shown, for example, in FIG. 2. Valve 88 is arranged to move within interior region 85 to open and close venting aperture 90 to regulate flow of fuel tank vapor into vent passageway 26 formed in inner outlet conduit 24.

In an embodiment illustrated in FIG. 2, vent controller 19 is separate from but coupled to foundation 25 of interior base 16 to form a sealed connection therebetween using suitable means such as spin-welding or laser-welding means. For example, mounting rings 102, 104 depend from annular horizontal plate 176 of foundation 25 and extend into annular spaces provided between annular mounting flanges 106, 108 included in anchor 86 of vent controller 19. In an illustrative embodiment, mounting flanges 106, 108 in anchor 86 of vent controller 19 and mounting rings 102, 104 of interior base foundation 25 are made of acetal and are welded to one another to couple vent controller 19 to interior base 16 of outer cover 17. It is within the scope of the present disclosure to couple rings 102, 104 to mounting flanges 106, 108 to retain vent controller 19 in a fixed position relative to tank mount 28 as suggested in FIGS. 2 and 4 using any suitable coupling means.

Top wall 13 of fuel tank 14 is formed to include a substantially flat top surface 13' arranged to mate with a substantially flat bottom surface 170 on annular weld pad 70 of tank mount 28 therein to facilitate coupling of tank mount 28 to fuel tank 14 as suggested in FIGS. 2-4. Flat top surface 13' of top wall 13 is heated and deformed as suggested in FIG. 4 during a welding operation. In an illustrative embodiment, shown best in FIG. 4, an inner ring 61, a surrounding outer ring 62, and an annular or round floor 63 arranged to lie between inner and outer rings 61, 62 cooperate to define a pad receiver 60 that is formed in top wall 13 when weld pad 70 of tank mount 28 is welded to top wall 13 of fuel tank 14.

Using an illustrative technique, annular weld pad 70 of tank mount 28 has an initial thickness 64. Exterior shell 18 is moved downwardly in direction 65 to cause annular weld pad 70 to contact top surface 13' of top wall 13 of fuel tank 14. Annular weld pad 70 and top wall 13 are heated during a welding operation. After treating both surfaces 13' and 170 with heat 200 during a conductive heat transfer process, the two surfaces 13' and 170 are pressed together to form a weld joint and form a pad receiver 60 in top wall 13 of fuel tank 14 as suggested in FIG. 4. Inner ring 61, surrounding outer ring 62, and round floor 63 are features that result from pressing a heated weld pad 70 into a molten surface 13' on top wall 13 of fuel tank 14. Annular flanges 66, 67 included in foundation 25 of interior base 16 are arranged to lie at about a small distance 68 from round floor 63 as shown, for example, in FIG. 4. The heated plastics material (e.g., HDPE) comprising annular weld pad 70 forms and flows in pad receiver 60 in top wall 13 and hardens to assume a "welded" shape shown, for example, in FIG. 4 to couple exterior shell 18 to top wall 13 of fuel tank 14 and retain vent controller 19 in a fixed position in mounting aperture 15 formed in top wall 13. As suggested in FIG. 4, once heated and deformed, weld pad 70 includes an annular radially inner portion 70a located in pad receiver 60 between inner ring 61 and annular flange 67 and an annular radially outer portion 70b also located in pad receiver 60 between annular flange 66 and outer ring 62.

Figure 5:
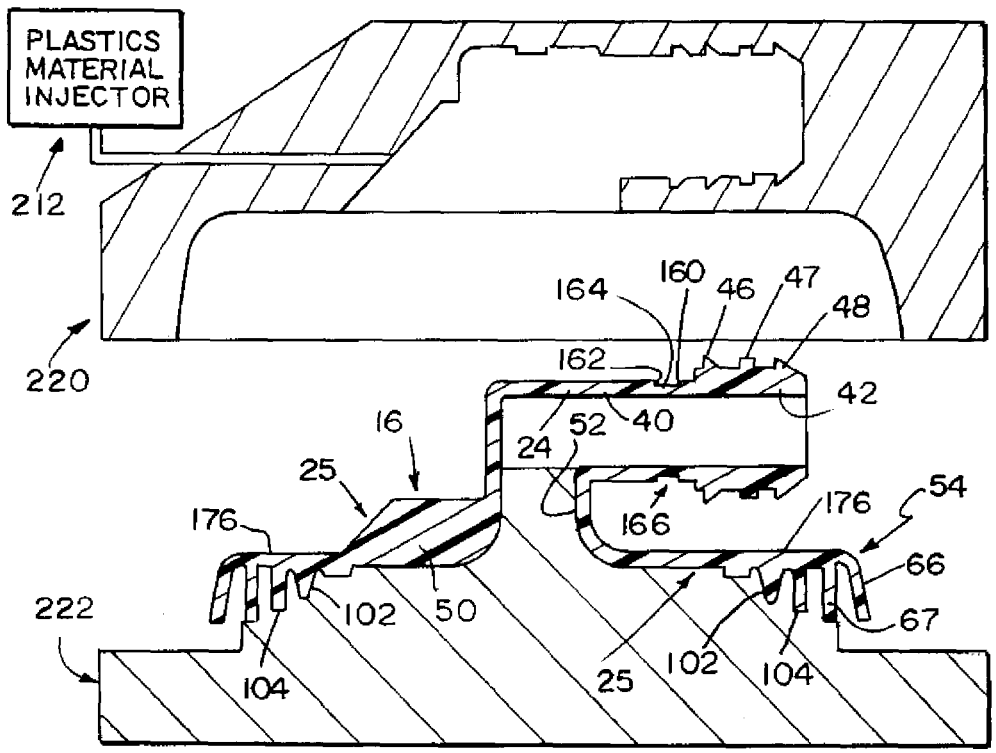
FIG. 5 is a "diagrammatic" sectional view of a plastic injection mold having an upper mold portion and a lower mold portion, here shown spaced apart in an "opened" position, and showing an interior base made of an acetal (POM) material pre-positioned within the lower mold portion prior to closing the mold and injecting an HDPE plastics material into a mold cavity formed in the upper and lower mold portions (in the manner shown in FIG. 6)
Figure 6:
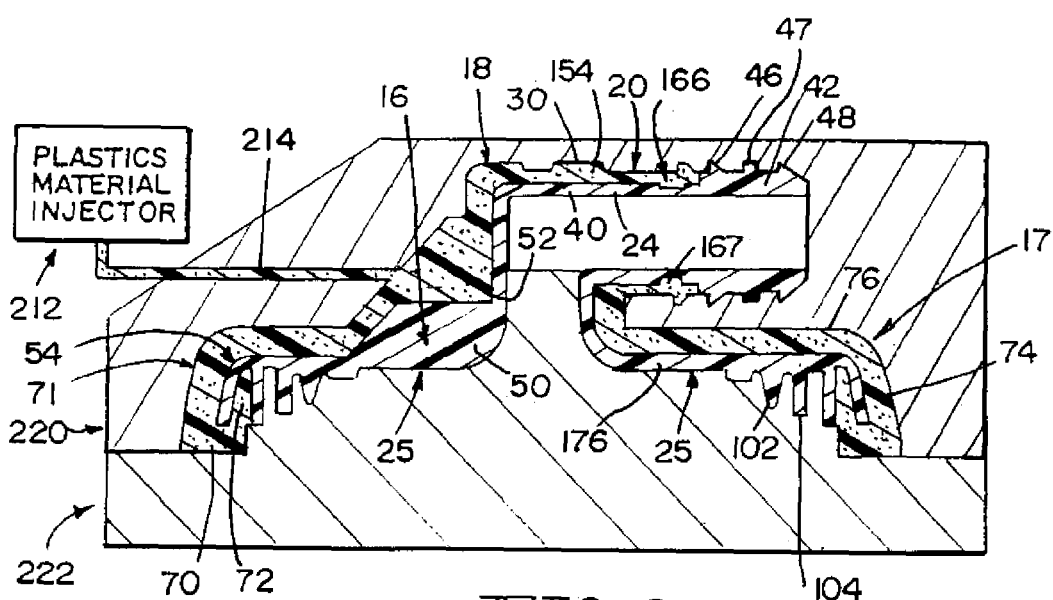
FIG. 6 is a sectional view similar to FIG. 5 showing the upper and lower mold portions in a closed position after the HDPE plastics material has been injected into the mold cavity through a channel formed in the upper mold portion so as to "overmold" the HDPE plastics material onto the acetal (POM) interior base to form an exterior shell coupled to the interior base to produce the outer cover of the vent apparatus.

One method of mating exterior shell 18 to interior base 16 is illustrated diagrammatically in FIGS. 5 and 6. A plastics material injector 212 is used to introduce a weldable (e.g., HDPE) plastics material 214 into a mold cavity containing interior base 16 and defined in upper and lower mold portions 220, 222. The shrink and pack pressure of the weldable material comprising exterior shell 18 creates an initial seal between the dissimilar materials in exterior shell 18 and interior base 16. The geometry of the interface between exterior shell 18 and interior base 16 uses a "fuel swell" characteristic of the weldable plastics material to increase the tightness or compression of the interface. In cases where this swell is not sufficient, O-ring seals (not shown) between exterior shell 18 and interior base 16 can be used.

As suggested, for example, in FIGS. 5 and 6, an exterior shell 18 made of high-density polyethylene (HDPE) is "overmolded" onto an interior base 16 made of acetal (e.g., POM). Inner conduit 24 is made of acetal and is longer than the surrounding outer outlet conduit 30 that is made of HDPE to create an acetal exposed portion 42 of inner outlet conduit 24.

As shown, for example, in FIGS. 1, 2, and 5, exposed portion 42 of inner outlet conduit 24 is made of acetal and includes first and second frustoconical annular hose mounts 46, 48 and intermediate annular hose mount 47 located in vapor-conducting passageway 32 formed in vapor discharge hose 22. Intermediate hose mount 47 lies in close proximity to second frustoconical hose mount 48 to define an annular chamber therebetween receiving an O-ring seal 49 as shown in FIG. 2. Intermediate annular hose mount 47 has a square or rectangular cross section. These hose mounts 46, 47, and 48 are arranged in series to engage an inner wall 22a of a surrounding portion 122 of vapor discharge hose 22 and cooperate with O-ring seal 49 to establish the seal connection (at 44) between vapor discharge hose 22 and exposed portion 42 of inner outlet conduit 24.

As shown best in FIGS. 1, 2, and 6, outer outlet conduit 30 is made of high-density polyethylene (HDPE) and includes a sleeve 154 surrounding shielded portion 40 of inner outlet conduit 24, a frustoconical annular hose mount 56 defining terminal opening 38, and an annular collar 58 interconnecting sleeve 154 and hose mount 56. Annular collar 58 surrounds shielded portion 40 of inner outlet conduit 24. An annular face 160 of hose mount 56 cooperates with an annular face 162 of sleeve 154 and an exterior wall 164 of annular collar 58 to define a radially outwardly opening annular channel 166 as suggested in FIG. 5. A radially inwardly extending annular rib 167 is appended to an interior wall of outer outlet conduit 30. Rib 167 extends into radially outwardly opening annular channel 166 to provide a "swell" or "vapor-activated" seal of the type disclosed herein (see, e.g., FIGS. 13 and 14). As suggested in FIG. 2, inner wall 50 of vapor discharge hose 22 is arranged to surround and engage each of the four radially extending annular hose mounts 56, 46, 47, and 48.

Interior base 16 is configured to include inner outlet conduit 24 and is made of a hydrocarbon "barrier" material such as acetal (POM). The barrier material acts as a shield that is resistant to hydrocarbon permeation to block hydrocarbon flow past interior base 16 into exterior shell 18 and then to the atmosphere surrounding exterior shell 18. Thus, hydrocarbon emission or escape to the atmosphere is minimized.

As suggested in FIG. 2, inner outlet conduit 24 is made of the hydrocarbon barrier material and extends "deep" into vapor-conducting passageway 32 formed in vapor discharge hose 22. Outer outlet conduit 30 provides more hose coverage and more compression of the sealing surfaces 46-49 and a more obstructed leakage path. A hydrocarbon-blocking seal is established between the acetal exposed portion 40 of inner outlet conduit 24 and, for example, a vapor discharge hose 22 made of a nylon material.

In the present design, HDPE material is overmolded onto acetal barrier material to enhance corrosion resistance of outer cover 17. Acidic cleaning solvents with a pH lower than about 7 are known. Outer cover 17 features an HDPE plastics material that encapsulates an acetal (POM) hydrocarbon barrier material and acts as a chemical barrier that blocks exposure to corrosive acid-like chemicals without significant loss of the material properties of either the HDPE or acetal materials.

In the present design, more acetal (POM) material is placed inside the inner wall 50 of the nylon vapor discharge hose 22. Hose mounts 46, 47, 48 are configured to resist surface mutilation from mild impacts sustained during shipping.

In the present design, any changes or variations in shape, thickness, or configuration of the HDPE exterior shell 18 do not alter the shape or thickness of interior base 16 configured to provide the hydrocarbon barrier. Cutting a hole or thinning an exterior wall of exterior shell 18 does not alter the hydrocarbon barrier properties of the acetal interior base 16 so long as the material removal process does not result in removal of some of the acetal material in interior base 16.

In the present design, impact resistance is enhanced owing to the HDPE outer layer. The HDPE exterior shell 18 does not crack or split apart when dropped from a height of about one meter onto a hard concrete surface.

Figure 8:
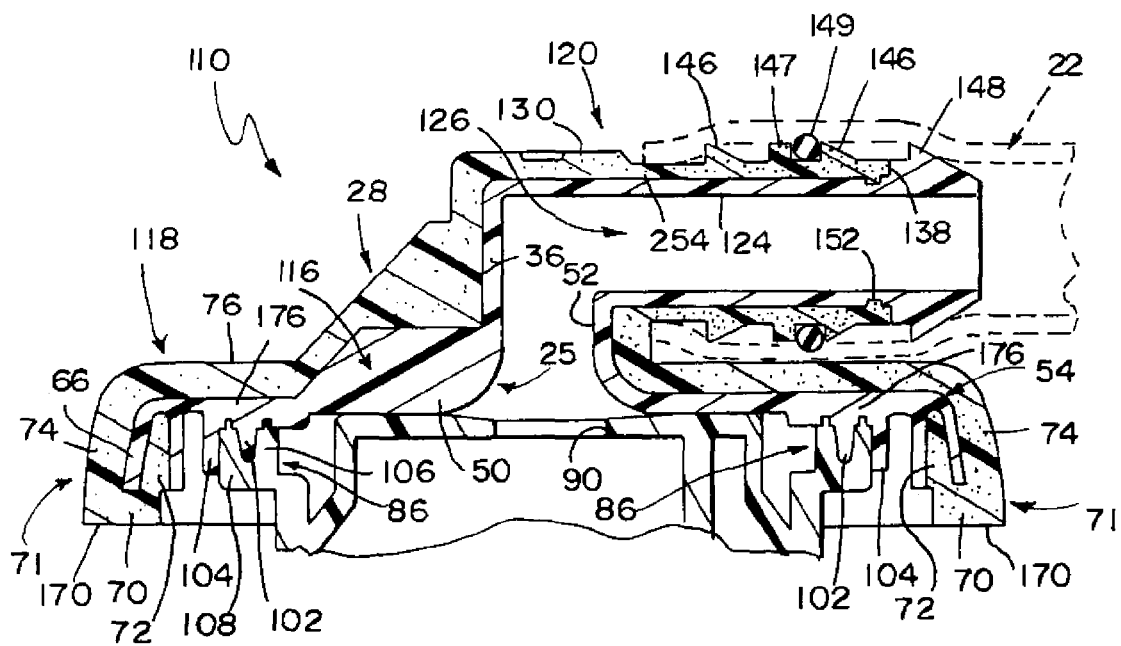
FIG. 8 is a sectional view taken along line 8-8 of FIG. 7 of a portion of the vent apparatus of FIG. 7 showing a vapor discharge hose (in phantom) coupled to the venting outlet included in the outer cover of the vent apparatus to establish a "multiple-seal" connection between the vapor discharge hose and the venting outlet.

A vent apparatus 110 in accordance with a second embodiment of the present disclosure is shown in FIGS. 7 and 8. Vent apparatus 110 includes an outer cover 117 coupled to vent controller 19. Outer cover 117 includes a venting outlet 120 coupled to vapor discharge hose 22 as suggested in FIGS. 8-10.

Figure 10:
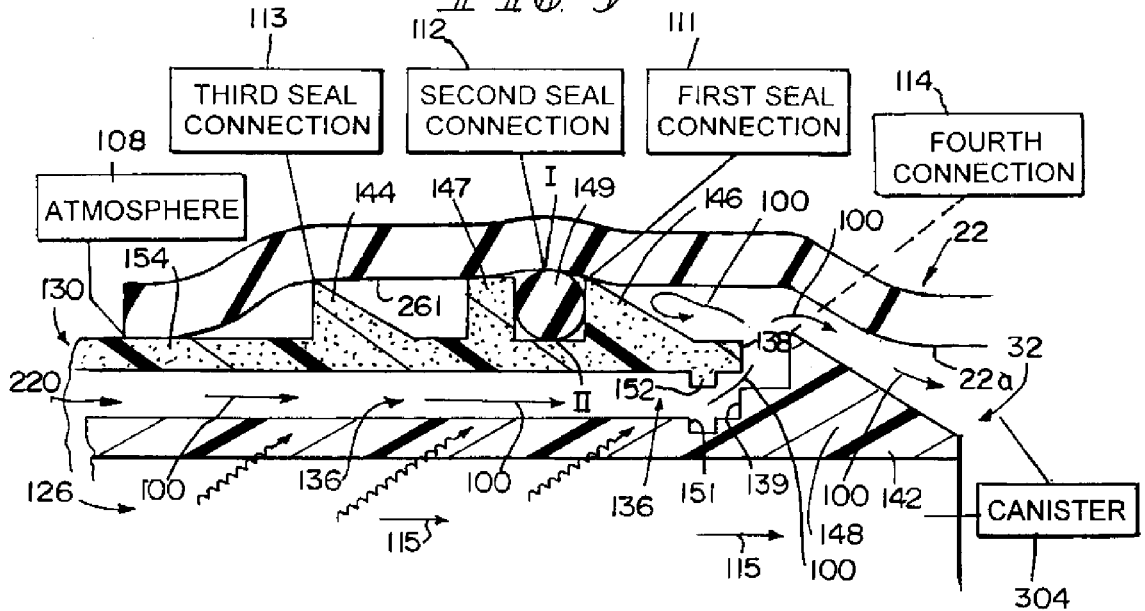
FIG. 10 is a sectional view similar to FIG. 9 of a portion of the venting outlet and mating vapor discharge hose diagrammatically showing permeation of hydrocarbon material through an inner outlet conduit included in the venting outlet and showing passage of that hydrocarbon material along a route at an interface or seam between the inner outlet conduit and a surrounding outer outlet conduit (included in the outer cover) to be discharged into a vent passageway formed in the vapor discharge hose.

Venting outlet 120 is adapted to mate with vapor discharge hose 22 to establish four seal connections 111, 112, 113, and 114 therebetween as suggested in FIGS. 9 and 10. Venting outlet 120 comprises an inner outlet conduit 124, an outer outlet conduit 130, and an O-ring seal 149 coupled to outer outlet conduit 130 as suggested, for example, in FIGS. 9 and 10.

Outer cover 117 includes an exterior shell 118 made of a weldable plastics material such as high density polyethylene (HDPE) and an interior base 116 made of a different plastics material such as acetal that is resistant to hydrocarbon permeation. Interior base 116 includes an inner outlet conduit 124 formed to include a vent passageway 126. Exterior shell 118 includes an outer outlet conduit 130 arranged to mate with and surround inner outlet conduit 124 as shown, for example, in FIGS. 8 and 9. Other than the shape of inner and outer outlet conduits 124, 130, in most respects, exterior shell 118 shown in FIGS. 7-10 is similar in shape, function, and material to exterior shell 18 shown in FIGS. 1-6 and interior base 116 shown in FIGS. 7-10 is similar to interior base 16 shown in FIGS. 1-6. Illustratively, exterior shell 118 is overmolded onto interior base 116 using a process similar to the process shown in FIGS. 5 and 6.

Vapor discharge hose 22 is formed to include a vapor-conducting passageway 32 and is coupled to inner and outer outlet conduits 124, 130 as suggested in FIG. 9 to establish a series of seal connections 111, 112, 113, and 114 therebetween. Vent passageway 126 formed in inner outlet conduit 124 is placed in fluid communication with vapor-conducting passageway 32 formed in vapor discharge hose 22. This arrangement causes any hydrocarbon material 100 (associated with fuel tank vapor 115 flowing in vent passageway 126) that has permeated inner outlet conduit 124 and reached an interface or seam 136 between inner and outer outlet conduits 124, 130 (as suggested diagrammatically in FIG. 10) and moved along interface 136 toward vapor discharge hose 22 to be discharged into vapor-conducting passageway 32 formed in vapor discharge hose 22. Such hydrocarbon material 100 then flows through vapor-conducting passageway 32 in vapor discharge hose 22 to a downstream destination (e.g., fuel vapor recovery canister 304) and is not discharged into the atmosphere around vent apparatus 110. Ideally, such downstream flow of hydrocarbon material 100 would be blocked by a seal connection 114; however, if such seal connection fails, hydrocarbon material 100 is discharged into vapor-conducting passageway 32 in vapor discharge hose 22.

Outer outlet conduit 130 is formed to include a terminal opening 138. Inner outlet conduit 124 extends through terminal opening 138 to define a shielded portion 140 surrounded by outer outlet conduit 130 and an exposed portion 142 located outside of outer outlet conduit 130 as suggested, for example, in FIG. 9. Vapor discharge hose 22 is also coupled to and arranged to surround a distal portion of outer outlet conduit 130 as shown, for example, in FIGS. 9 and 10 to establish a series of seal connections therebetween. These first, second, and third seal connections, e.g., 111, 112, and 113 cooperate to block flow of permeated fuel tank vapor 115 exiting interface 136 and flowing into vapor-conducting passageway 32 into atmosphere 108 along an interface between an exterior portion of outer outlet conduit 130 and an interior surface 50 of vapor discharge hose 22 as suggested in FIG. 10.

As shown, for example, in FIGS. 9 and 10, exposed portion 142 of inner outlet conduit 124 is made of acetal (POM) and includes a frustoconical annular hose mount 148. A fourth seal connection 114 is established by mating and sealing engagement of hose mount 148 and vapor discharge hose 22 as suggested in FIG. 9.

Shielded portion 140 of inner outlet conduit 124 is formed to include an annular rib-receiving channel 151 facing radially outwardly to receive a radially inwardly extending annular rib 152 appended to an interior wall (along interface 136) of outer outlet conduit 130 to provide a "swell" or "vapor-activated" seal connection as suggested in FIGS. 9 and 10. Exposed portion 142 of inner outlet conduit 124 also includes a rearwardly facing annular surface 139 arranged to face toward and mate with outer outlet conduit 130 as suggested in FIGS. 9 and 10. In the illustrated embodiment, annular rib-receiving channel 151 is located in spaced-apart relation to rearwardly facing surface 139 and, in this region, interface 136 has a "serpentine" shape characterized by two "exterior" corners 135 and three "interior" corners 137 as suggested in FIG. 9.

As shown, for example, in FIGS. 9 and 10, the distal portion of outer outlet conduit 130 is made of high-density polyethylene (HDPE) and includes a sleeve 254. Sleeve 254 is arranged to surround shielded portion 140 of inner outlet conduit 124, carry annular rib 152, and define terminal end 138 as shown in FIG. 9. The distal portion of outer outlet conduit 130 also includes first and second frustoconical annular hose mounts or barbs 144, 146 and an intermediate annular hose mount or barb 147 located between hose mounts 144, 146. Intermediate annular hose mount 147 has a square or rectangular cross section in the illustrated embodiment and provides an O-ring "stop."

An O-ring seal 149 is retained in a chamber formed between intermediate annular hose mount 147 and second frustoconical annular hose mount 146 as shown, for example, in FIGS. 9 and 10. Second seal connection 112 is established as suggested, for example, in FIGS. 9 and 10 by mating and sealing engagement of O-ring seal 149 with (1) an interior surface 261 of vapor discharge hose 22 along a first "contact line" (I) and (2) an annular exterior surface of outer outlet conduit 130 located between hose mounts 247 and 248 along a second contact line (II). Thus, second seal connection 112 comprises two "ready-state," "seat" seal connections as described hereinbelow. First, second, and fourth seal connections 111, 113, and 114 comprise "ready-state," "point" seal connections as described hereinbelow.

A vent apparatus 210 in accordance with a third embodiment of the present disclosure is suggested in FIGS. 11-14. Vent apparatus 210 includes a venting outlet 220 coupled to vapor discharge hose 22 as suggested in FIGS. 11 and 12. Venting outlet 220 is adapted to mate with vapor discharge hose 22 to establish, for example, four seal connections 211, 212, 213, and 214 as suggested in FIGS. 11 and 12.

Venting outlet 220 includes an outer outlet conduit 230 arranged to mate with and surround an inner inlet conduit 224 as shown, for example, in FIG. 11. Illustratively, outer outlet conduit 230 is made of high-density polyethylene (HDPE) and is overmolded onto an inner outlet conduit 224 made of a different plastics material such as acetal that is resistant to hydrocarbon permeation.

An O-ring seal 200 is associated with inner and outer outlet conduits 224, 230 and included in venting outlet 220 as suggested in FIG. 11. In an illustrative embodiment, O-ring seal 200 comprises a ring-shaped core 201 and a ring-shaped tubular cover 202 formed to include an interior passageway containing ring-shaped core 201. In other words, cover 202 "encapsulates" core 201. Ring-shaped core 201 is made of a fuel-resistant elastomer material such as, for example, fluorocarbon rubber (FKM). Tubular cover 202 is made of a permeation barrier material such as, for example, polytetrafluoridethylene (PTFE) or other polymeric material.

Vapor discharge hose 22 is formed to include a vapor-conducting passageway 32 and is coupled to inner and outer outlet conduits 224, 230 and to O-ring seal 200 as suggested in FIG. 11 to establish a series of sealed connections 211, 212, 213, and 214 therebetween. Vapor discharge hose 22 is coupled to a fuel vapor recovery canister 204 to conduct fuel vapor from venting outlet 22 to canister 204 as suggested in FIG. 11.

A vent passageway 226 formed in inner outlet conduit 224 is placed in fluid communication with vapor-conducting passageway 32 formed in vapor discharge hose 22 as suggested in FIG. 11. This causes any fuel tank vapor 115 flowing in vent passageway 226 to be discharged into vapor-conducting passageway 32 for delivery to canister 204 through vapor discharge hose 22.

Outer outlet conduit 230 is formed to include a terminal opening 238 as shown in FIG. 11. Inner outlet conduit 224 extends through terminal opening 238 to define a shielded portion 240 surrounded by outer outlet conduit 230 and an exposed portion 242 located outside of outer outlet conduit 230 as shown, for example, in FIG. 11.

As shown in FIGS. 11 and 12, the distal portion of outer outlet conduit 230 is made of high-density polyethylene (HDPE) and includes sleeve 354. Sleeve 354 is arranged to surround shielded portion 240 of inner outlet conduit 224, carry an annular rib 252 sized to fit into a rib-receiving channel 251 formed in inner outlet conduit 224, and define terminal end 138. The distal portion of outer outlet conduit 230 also includes first and second frustoconical annular hose mounts or barbs 244, 246 and an annular hose mount 247 located between second hose mount 246 and O-ring seal 200. Annular hose mount 247 has a square or rectangular cross section in the illustrated embodiment.

First, second, and third seal connections 211, 212, and 213 cooperate to block flow of fuel vapor (or hydrocarbon material) along an annular path 207 formed between outer outlet conduit 230 and vapor discharge hose 22 to atmosphere 206 through any gap or opening 208 that may exist at a free end 209 of vapor discharge hose 22. Thus, seal connections 211, 212, and 213 cooperate to block fuel vapor discharge to atmosphere through gap 208.

First and fourth seal connections 211, 214 cooperate to block flow of any hydrocarbon material 100 (associated with fuel tank vapor 115 flowing in vent passageway 226) that has permeated inner outlet conduit 224 and reached an interface or seam 236 between inner and outer outlet conduits 224, 230 (as suggested diagrammatically in FIG. 12) and moved along interface 236 in direction 237 into vapor-conducting passageway 32 of vapor discharge hose 22. Seal connections 211, 214 cooperate to provide means for equalizing the ambient fuel vapor pressure in interface or seam 236 and vapor-conducting passageway 32 in vapor discharge hose 22. The flow rate of fuel vapor or hydrocarbon material 100 in interface of seam 236 is a function of and proportional to the pressure differential between interface or seam 236 and vapor-conducting passageway 32. Since the pressure differential is substantially zero owing to the presence of seal connections 211, 214, the flow rate of fuel vapor or hydrocarbon material 100 in interface or seam 236 is zero. Such a phenomenon "discourages" any permeation of fuel vapor 100 or hydrocarbon material from vent passageway 226 formed in inner outlet conduit 224 through the material (e.g., acetal) forming inner outlet conduit 224 into interface of seam 236 defined between inner and outer outlet conduits 224, 230.

First seal connection 211 is established, for example, as suggested in FIG. 11, by mating and sealing engagement of O-ring seal 200 with both of inner and outer outlet conduits 224, 230. In the illustrated embodiment, as shown in FIG. 12, O-ring seal is mated and sealingly engaged with: (1) an interior surface 261 of vapor discharge hose 22 along a first "contact line" (I); (2) an inclined exterior surface 262 of a first gland 272 included in outer outlet conduit 230 along a second contact line (II); and (3) an oppositely sloping inclined exterior surface 263 of a second gland 273 included in inner outlet conduit 224 along a third contact line (III). Herein a "gland" is a device for preventing leakage of a fluid past a joint in machinery. In the illustrated embodiment, each of the contact lines (I), (II), and III) are substantially circular and first and second glands 272, 273 mate as shown in FIG. 11 to cause inclined exterior surfaces 262, 263 to cooperate to form a "V-shaped" wall mating with O-ring seal 200. This causes interface or seam 236 formed between inner and outer outlet conduits 224, 230 to "empty" into a "closed" annular space bounded at one end by O-ring seal 200, inclined exterior surface 262 of first gland 272, and inclined exterior surface 263 of second gland 273. Thus, O-ring seal 200 operates to "plug" a downstream end of interface or seam 236 so that fuel vapor or hydrocarbon material cannot flow from interface or seam 236 (1) into vapor-conducting passageway 32 of vapor discharge hose 22 leading to canister 204 or (2) into annular path 207 leading to atmosphere 206. As used herein, a "seat seal" is a seal of the type established at contact lines (I), (II), and (III) in FIG. 12 by engagement of a seal ring and a gland. Therefore, in the embodiment illustrated in FIGS. 11 and 12, there are shown three seat seals at contact lines (I), (II), and (III).

Second seal connection 212 is established, for example, by mating and sealing engagement of second frustoconical annular hose mount 246 of outer outlet conduit 230 with interior surface 261 of vapor discharge hose 22 as suggested in FIGS. 11 and 12. This type of seal is called a "point seal" herein. As used herein, a point seal is formed under the "band" of contact of two materials under pressure in a bushing-and-interfering-pin installation. Hose mount 246 is held stationary against hose 22 such that the contact band creates localized yielding of the materials. The contact band is formed along the vertex of an acute angle of hose mount 246 which is unsupported along either side of the contact band. This arrangement facilitates the "flow" of the softer material (e.g., hose 22) into voids and surfaces of the harder material (e.g., hose mount 246) while hose 22 constricts around hose mount.

Third seal connection 213 is established, for example, by mating and sealing engagement of first frustoconical annular hose mount 244 of outer outlet conduit 230 with interior surface 261 of vapor discharge hose 22 as suggested in FIGS. 11 and 12. This is another example of a point seal.

Annular hose mount 247 in outer outlet conduit 230 is not a point seal of the type provided by hose mounts 244, 246. Hose mount 247 has a "cylindrical" shape and is perpendicular and parallel along the contact edges so as to support and impede the softer material of hose 22 from constricting into the harder material of hose mount 247.

Fourth seal connection 214 is established, for example, by mating and sealing engagement of a frustoconical annular hose mount 48 included in inner outlet conduit 224 with interior surface 261 of vapor discharge hose 22 as suggested in FIGS. 11 and 12. This is another example of a point seal.

Each of the three point seals established by second, third, and fourth seal connections 212, 213, and 214 and each of the three seat seals established by O-ring seal 200 (of first seal connection 211) along contact lines (I), (II), and (III) are identified herein as "ready-state" seals. This kind of seal is "ready for duty" immediately after assembly. Ready-state seals use material compression along a band of contact of two materials to close a flow path at the interface of two adjacent (i.e., laminated) materials. Neither time nor exposure to fuel vapor is required to "activate" sealing properties of a ready-state seal. The seal is in place immediately after swedging (1)

hose 22 onto barbs 244, 246, 248 and (2) O-ring seal 200 onto both inner and outer outlet conduits 224, 226.

Figure 13:
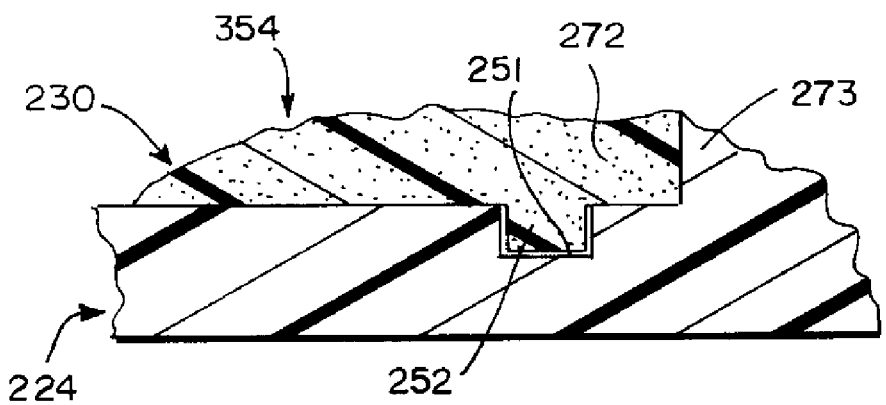
FIG. 13 is an enlarged view of portions of the inner and outer outlet conduits shown in FIG. 11 upon insertion of a radially inwardly extending annular rib included in the outer outlet conduit into an annular rib-receiving channel formed in the inner outlet conduit before sufficient exposure of the outer outlet conduit to fuel vapor to establish a "vapor-activated" seal between the inner and outer outlet conduits.
Figure 14:
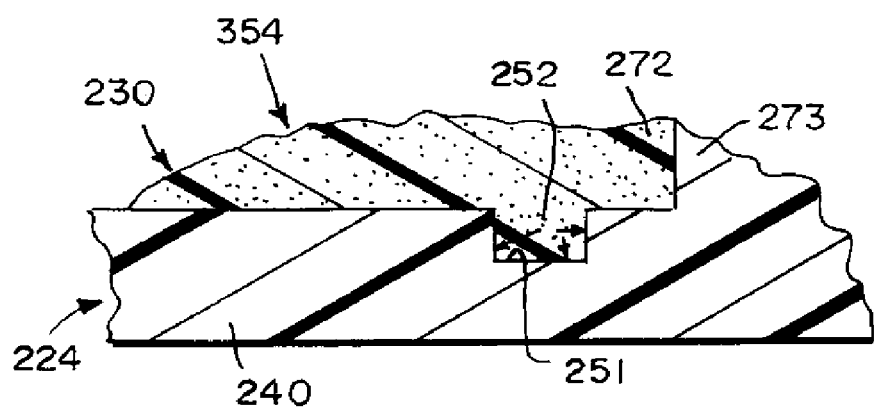
FIG. 14 is a view similar to FIG. 13 after "swelling" of the annular rib in all directions in the annular rib-receiving channel caused by exposure of the outer outlet conduit to fuel vapor so that a vapor-activated seal is established in the rib-receiving channel in response to sealing engagement of the rib and the inner outlet conduit to block flow of fuel vapor through the rib-receiving channel from the interface or seam between the inner and outer outlet conduits and the vent passageway formed in the vapor discharge hose.

As suggested in FIGS. 13 and 14, shielded portion 240 of inner inlet conduit 224 is formed to include an annular rib-receiving channel 151 facing radially outwardly to receive a radially inwardly extending annular rib 252 appended to an interior wall (along interface or seam 236) of outer outlet conduit 230 to provide a "swell" or "vapor-activated" seal. This kind of vapor-activated seal connection uses material swelling in the presence of fuel vapor to tighten the fit between inner and outer outlet conduits in rib-receiving channel 151 as suggested in FIG. 14. Tightening the fit has the effect of diminishing the size of any vapor flow path which may exist therebetween which creates back pressure and flow resistance.

A liquid fuel and fuel vapor seal connection is created along annular rib 252 in rib-receiving channel 251 by exposure of rib 252 to fuel vapor. Rib 252 is made of an HDPE material that swells when exposed to fuel vapor. Inner outlet conduit 224 forms rib-receiving channel 251 and is made of an acetal (POM) material that swells very little when exposed to fuel vapor. Voids, surface imperfections, and seams provide a flow path for fuel vapor at the interface of inner and outer outlet conduits 224, 230 along annular rib 252. Without activation of rib 252 by fuel vapor, the flow path along rib 252 in rib-receiving channel has a constant size and restriction as suggested in FIG. 13. However, when the air flowing through that flow path contains fuel vapor, rib 252 begins to swell in channel 251. As fuel vapor permeates rib 252, rib 252 begins to swell and expand outwardly in all directions in channel 251 with great force. The tightening or increase in interference closes flow paths and increase fuel vapor flow restriction. This activated seal connection applies to ribs 167, 152, and 252 disclosed herein.

The invention claimed is:

1. A vehicle fuel system comprising
a vent apparatus including a vent controller sized to extend through a mounting aperture formed in a fuel tank and an outer cover coupled to the vent controller and adapted to be coupled to the fuel tank to close the mounting aperture and to support the vent controller in communication with an interior region in a fuel tank,
wherein the outer cover includes an interior base made of acetal and coupled to the vent controller and an exterior shell made of a weldable material and adapted to be welded to the fuel tank, the outer cover includes a venting outlet defined by portions of the interior base and the exterior shell and adapted to be coupled to a vapor discharge hose configured to conduct fuel vapor discharged by the vent controller, the interior base includes an inner outlet conduit providing a vent passageway, and the exterior shell includes an outer outlet conduit surrounding the inner outlet conduit to define the venting outlet,
wherein the outer outlet conduit is formed to include a terminal opening,
wherein the inner outlet conduit is arranged to extend through the terminal opening to define a shielded portion thereof surrounded by the outer outlet conduit and an exposed portion thereof located outside of the outer outlet conduit and formed to include a terminal end arranged to lie in spaced-apart relation to the outer outlet conduit,
wherein the outer outlet conduit includes an interior wall facing toward the shielded portion of the inner outlet conduit, an exterior wall facing away from the shielded portion of the inner outlet conduit, and a first annular hose mount coupled to the exterior wall of the outer outlet conduit and arranged to extend radially outwardly to mate with an inner wall of a vapor discharge hose having a vapor-conducting passageway receiving the outer and inner outlet conduits therein to define a first seal connection between the venting outlet and the vapor discharge hose,
wherein the inner outlet conduit includes a second annular hose mount coupled to the exposed portion of the inner outlet conduit and arranged to lie between the first annular hose mount and the terminal end and to extend radially outwardly to mate with the inner wall of the vapor-discharge hose to define a second seal connection between the venting outlet and the vapor discharge hose, a third annular hose mount coupled to the exposed portion of the inner outlet conduit and arranged to lie between the second annular hose mount and the terminal end and to extend radially outwardly to mate with the inner wall of the vapor discharge hose to define a third seal connection between the venting outlet and the vapor discharge hose, and an intermediate annular hose mount coupled to the exposed portion of the inner outlet conduit and arranged to lie in close proximity to the third annular hose mount and to extend radially outwardly to define an annular chamber between the intermediate and third annular hose mounts, and
wherein the venting outlet further includes an O-ring seal received in the annular chamber formed in the inner outlet conduit and arranged to mate with the exposed portion of the inner outlet conduit and the inner wall of the vapor discharge hose to define a fourth seal connection between the venting outlet and the vapor discharge hose.

2. The vehicle fuel system of claim 1, wherein the inner outlet conduit is formed to include an interior wall defining the vent passageway and an exterior wall facing toward the interior wall of the outer outlet conduit, the inner outlet conduit is formed to include a radially outwardly opening annular rib-receiving channel interrupting the exterior wall of the inner outlet conduit, and the outer outlet conduit further includes an annular rib coupled to the interior wall of the outer outlet conduit and arranged to extend radially inwardly into the radially outwardly opening annular rib-receiving channel formed in the inner outlet conduit to provide means for establishing a vapor-activated seal connection between the inner and outer outlet conduits in response to swelling of portions of the inner and outer outlet conduits in the presence of fuel vapor in the vent passageway to tighten a fit between the inner and outer outlet conduits in the radially outwardly opening annular rib-receiving channel so that the size of any vapor flow path extant therein is diminished to create back pressure and vapor flow resistance.

3. The vehicle fuel system of claim 1, wherein the inner and outer outlet conduits cooperate to define a seam located between the exterior wall of the inner outlet conduit and the interior wall of the outer outlet conduit and outlet means (near) for discharging any hydrocarbon material associated with permeated fuel tank vapor flowing in the vent passageway that has permeated the inner outlet conduit to reach and flow in the seam into the vapor-conducting passageway formed in the vapor discharge hose and the outlet means is formed in the venting outlet and positioned to lie between the first annular hose mount and the second annular hose mount so that the first seal connection established by the first annular hose mount blocks flow of any permeated fuel tank vapor exiting the seam through the outlet means toward atmosphere communicating with a terminal opening formed in the vapor discharge hose along an interface between the exterior wall of the outer outlet conduit and an interior surface of the vapor discharge hose.

4. A vehicle fuel system comprising
a vent apparatus including a vent controller sized to extend through a mounting aperture formed in a fuel tank and an outer cover coupled to the vent controller and adapted to be coupled to the fuel tank to close the mounting aperture and to support the vent controller in communication with an interior region in a fuel tank,
wherein the outer cover includes an interior base made of acetal and coupled to the vent controller and an exterior shell made of a weldable material and adapted to be welded to the fuel tank, the outer cover includes a venting outlet defined by portions of the interior base and the exterior shell and adapted to be coupled to a vapor discharge hose configured to conduct fuel vapor discharged by the vent controller, the interior base includes an inner outlet conduit providing a vent passageway, and the exterior shell includes an outer outlet conduit surrounding the inner outlet conduit to define the venting outlet,
wherein the outer outlet conduit is formed to include a terminal opening,
wherein the inner outlet conduit is arranged to extend through the terminal opening to define a shielded portion thereof surrounded by the outer outlet conduit and an exposed portion thereof located outside of the outer outlet conduit and formed to include a terminal end arranged to lie in spaced-apart relation to the outer outlet conduit,
wherein the outer outlet conduit includes an interior wall facing toward the shielded portion of the inner outlet conduit, an exterior wall facing away from the shielded portion of the inner outlet conduit, and a first annular hose mount coupled to the exterior wall of the outer outlet conduit and arranged to extend radially outwardly to mate with an inner wall of a vapor discharge hose having a vapor-conducting passageway receiving the outer and inner outlet conduits therein to define a first seal connection between the venting outlet and the vapor discharge hose, an intermediate annular hose mount coupled to the exterior wall of the outer outlet conduit and arranged to lie in spaced-apart relation to the terminal opening to locate the first annular hose mount therebetween and to lie in close proximity to the first annular hose mount and to extend radially outwardly from the exterior surface of the outer outlet conduit to define an annular chamber between the intermediate and first annular hose mount,
wherein the venting outlet further includes an O-ring seal received in the annular chamber formed in the outer outlet conduit and arranged to mate with the outer outlet conduit (at II) and the inner wall of the vapor discharge hose (at I) to define a second seal connection between the venting outlet and the vapor discharge hose,
wherein the outer outlet conduit further includes a second annular hose mount coupled to the exterior wall of the outer outlet conduit and arranged to lie in spaced-apart relation to the first annular hose mount to locate the intermediate hose mount therebetween and arranged to extend radially outwardly from the exterior wall of the outer outlet conduit to mate with the inner wall of the vapor discharge hose to define a third seal connection therebetween, and
wherein the inner outlet conduit includes a third annular hose mount coupled to the exposed portion of the inner outlet conduit and arranged to lie in spaced-apart relation to the intermediate hose mount to locate the first annular hose mount therebetween and to extend radially outwardly to mate with the inner wall of the vapor discharge hose to define a fourth seal connection between the venting outlet and the vapor discharge hose.

5. The vehicle fuel system of claim 3, wherein the inner outlet conduit is formed to include an interior wall defining the vent passageway and an exterior wall facing toward the interior wall of the outer outlet conduit, the inner outlet conduit is formed to include a radially outwardly opening annular rib-receiving channel interrupting the exterior wall of the inner outlet conduit, and the outer outlet conduit further includes an annular rib coupled to the interior wall of the outer outlet conduit and arranged to extend radially inwardly into the radially outwardly opening annular rib-receiving channel formed in the inner outlet conduit to provide means for establishing a vapor-activated seal connection between the inner and outer outlet conduits in response to swelling of portions of the inner and outer outlet conduits in the presence of fuel vapor in the vent passageway to tighten a fit between the inner and outer outlet conduits in the radially outwardly opening annular rib-receiving channel so that the size of any vapor flow path extant therein is diminished to create back pressure and vapor flow resistance.

6. The vehicle fuel system of claim 4, wherein the inner and outer outlet conduits cooperate to define a seam located between the exterior wall of the inner outlet conduit and the interior wall of the outer outlet conduit and outlet means for discharging any hydrocarbon material associated with permeated fuel tank vapor flowing in the vent passageway that has permeated the inner outlet conduit to reach and flow in the seam into the vapor-conducting passageway formed in the vapor discharge hose and the outlet means is formed in the venting outlet and positioned to lie between the first and third annular hose mounts, the vapor discharge hose is coupled to and arranged to surround a distal portion of the outer outlet conduit to establish the first, second, and third seal connections therebetween, and the first annular hose mount, the O-ring seal, and the second annular hose mount are arranged to cause the first, second, and third seal connections to cooperate to block flow of any permeated fuel tank vapor exiting the seam through the outlet means and flowing into the vapor-conducting passageway toward atmosphere communicating with a terminal opening formed in the vapor discharge hose along an interface between the exterior wall of the outer outlet conduit and an interior surface of the vapor discharge hose.

7. The vehicle fuel system of claim 4, wherein the second seal connection is established by mating and sealing engagement of the O-ring seal with an interior surface of the vapor discharge hose along an annular first contact line (I) and the exterior wall of the outer outlet conduit along an annular second contact line (II) to provide two ready-state, seat seal connections along the O-ring seal.

8. A vehicle fuel system comprising
a vent apparatus including a vent controller sized to extend through a mounting aperture formed in a fuel tank and an outer cover coupled to the vent controller and adapted to be coupled to the fuel tank to close the mounting aperture and to support the vent controller in communication with an interior region in a fuel tank,
wherein the outer cover includes an interior base made of acetal and coupled to the vent controller and an exterior shell made of a weldable material and adapted to be welded to the fuel tank, the outer cover includes a venting outlet defined by portions of the interior base and the exterior shell and adapted to be coupled to a vapor discharge hose configured to conduct fuel vapor discharged by the vent controller, the interior base includes an inner outlet conduit providing a vent passageway, and the exterior shell includes an outer outlet conduit surrounding the inner outlet conduit to define the venting outlet, wherein the outer outlet conduit is formed to include a terminal opening, wherein the inner outlet conduit is arranged to extend through the terminal opening to define a shielded portion thereof surrounded by the outer outlet conduit and an exposed portion thereof located outside of the outer outlet conduit and formed to include a terminal end arranged to lie in spaced-apart relation to the outer outlet conduit, wherein the outer outlet conduit includes an interior wall facing toward the shielded portion of the inner outlet conduit, an exterior wall facing away from the shielded portion of the inner outlet conduit, and a first annular hose mount coupled to the exterior wall of the outer outlet conduit and arranged to extend radially outwardly to mate with an inner wall of a vapor discharge hose having a vapor-conducting passageway receiving the outer and inner outlet conduits therein to define a second seal connection between the venting outlet and the vapor discharge hose, a second annular hose mount coupled to the exterior wall of the outer outlet conduit and arranged to extend radially outwardly to define a third seal connection between the venting outlet and the vapor discharge hose, wherein the inner outlet conduit includes a third annular hose mount coupled to the exposed portion of the inner outlet conduit and to extend radially outwardly to mate with the inner wall of the vapor discharge hose to define a fourth seal connection between the venting outlet and the vapor discharge hose, wherein the outer outlet conduit further includes an intermediate annular hose mount coupled to the exterior wall of the outer outlet conduit and arranged to lie between the first and third annular hose mounts and to extend radially outwardly to define an annular chamber between the intermediate and third annular hose mounts, and wherein the venting outlet further includes an O-ring seal received in the annular chamber formed between the outer and inner outlet conduits, both conduits contacting and sealing against an inner radial surface of the O-ring seal, and arranged to mate with the vapor discharge hose (at I), the outer outlet conduit (at II), and the exposed portion of the inner outlet conduit (at III) to define a first seal connection between the venting outlet and the vapor discharge hose.

9. The vehicle fuel system of claim 8, wherein the inner outlet conduit is formed to include an interior wall defining the vent passageway and an exterior wall facing toward the interior wall of the outer outlet conduit, the inner outlet conduit is formed to include a radially outwardly opening annular rib-receiving channel interrupting the exterior wall of the inner outlet conduit, and the outer outlet conduit further includes an annular rib coupled to the interior wall of the outer outlet conduit and arranged to extend radially inwardly into the radially outwardly opening annular rib-receiving channel formed in the inner outlet conduit to provide means for establishing a vapor-activated seal connection between the inner and outer outlet conduits in response to swelling of portions of the inner and outer outlet conduits in the presence of fuel vapor in the vent passageway to tighten a fit between the inner and outer outlet conduits in the radially outwardly opening annular rib-receiving channel so that the size of any vapor flow path extant therein is diminished to create back pressure and vapor flow resistance.

10. The vehicle fuel system of claim 8, wherein the O-ring seal comprises a ring-shaped core made of a fuel-resistant elastomer and a ring-shaped tubular cover formed to include an interior passageway containing the ring-shaped core and made of a fuel vapor permeation barrier material.

11. The vehicle fuel system of claim 8, wherein the first and fourth seal connections cooperate to provide means for blocking flow of any hydrocarbon material associated with fuel tank vapor flowing in the vent passageway that has permeated the inner outlet conduit and reached a seam formed between the inner and outer outlet conduits and moved along the seam into the vapor-conducting passageway of the vapor discharge hose and for equalizing ambient fuel vapor pressure in the seam and the vapor-conducting passageway to cause the pressure differential between fuel vapor pressure in the seam and the vapor-conducting passageway to be about zero and to cause the flow rate of fuel vapor and hydrocarbon material in the seam to be about zero so that permeation of fuel vapor and hydrocarbon material extant in the vent passageway formed in the inner inlet conduit through the acetal material forming the inner inlet conduit into the seam defined between the inner and outer outlet conduits is discouraged.

12. The vehicle fuel system of claim 11, wherein the O-ring seal comprises a ring-shaped core made of a fuel-resistant elastomer and a ring-shaped tubular cover formed to include an interior passageway containing the ring-shaped core and made of a fuel vapor permeation barrier material.

13. The vehicle fuel system of claim 8, wherein the first seal connection is established by mating and sealing engagement of the O-ring seal with an interior surface of the vapor discharge hose along a circular first contact line (I), an inclined exterior surface of a first gland included in the outer outlet conduit along a circular second contact line (II), and an oppositely sloping inclined exterior surface of a second gland included in the inner outlet conduit along a circular third contact line (III), the first and second glands mate to cause the exterior surfaces thereof to cooperate to form a V-shaped wall mating with the O-ring seal to cause the seam formed between the inner and outlet conduits to empty into a closed annular space bounded at one end by the O-ring seal, the inclined exterior surface of the first gland, and the exterior surface of the second gland to cause the O-ring seal to provide means for plugging a downstream end of the seam so that fuel vapor and hydrocarbon material cannot flow from the seam into the vapor-conducting passageway of the vapor discharge hose leading to a fuel vapor recovery canister and to an annular path leading to atmosphere.

14. The vehicle fuel system of claim 13, wherein the O-ring seal comprises a ring-shaped core made of a fuel-resistant elastomer and a ring-shaped tubular cover formed to include an interior passageway containing the ring-shaped core and made of a fuel vapor permeation barrier material.

* * * * *